United States Patent
Oh et al.

(10) Patent No.: US 12,518,953 B2
(45) Date of Patent: Jan. 6, 2026

(54) PLASMA PROCESSING APPARATUS AND METHOD OF MANUFACTURE

(71) Applicant: SAMSUNG ELECTRONICS CO., LTD., Suwon-si (KR)

(72) Inventors: Se Jin Oh, Suwon-si (KR); Yeong Kwang Lee, Suwon-si (KR); Jong Hun Pi, Suwon-si (KR); Jung Min Ko, Suwon-si (KR); Doug Yong Sung, Suwon-si (KR)

(73) Assignee: Samsung Electronics Co., Ltd., Seoul (KR)

( * ) Notice: Subject to any disclaimer, the term of this patent is extended or adjusted under 35 U.S.C. 154(b) by 332 days.

(21) Appl. No.: 18/105,918

(22) Filed: Feb. 6, 2023

(65) Prior Publication Data

US 2023/0377857 A1    Nov. 23, 2023

(30) Foreign Application Priority Data

May 23, 2022  (KR) .................. 10-2022-0062778

(51) Int. Cl.
  *H01J 37/32*   (2006.01)
  *G01J 3/02*    (2006.01)

(52) U.S. Cl.
  CPC ....... *H01J 37/32972* (2013.01); *G01J 3/0208* (2013.01); *G01J 3/021* (2013.01); *G01J 3/0291* (2013.01)

(58) Field of Classification Search
  CPC .......... H01J 37/32972; H01J 2237/334; H01J 2237/335; G01J 3/0208; G01J 3/021;
  (Continued)

(56) References Cited

U.S. PATENT DOCUMENTS 8,358,416 B2  1/2013 Venugopal et al.
10,481,005 B2  11/2019 Oh et al.
(Continued)

FOREIGN PATENT DOCUMENTS

JP       01306561 A  * 12/1989
JP    2004354055 A    12/2004
(Continued)

OTHER PUBLICATIONS

Machine Translation JP 01-306561 (Year: 1989).*

*Primary Examiner* — Rodney G McDonald
(74) *Attorney, Agent, or Firm* — Fish & Richardson P.C.

(57) ABSTRACT

A plasma processing apparatus includes; a housing including a first side wall and a second side wall, wherein the housing defines a processing region in which plasma is generated, an optical source unit disposed on the first side wall in alignment with the viewing window, wherein the optical source unit is configured to irradiate the processing region with incident light through the viewing window, a reflector disposed on the second side wall of the housing, wherein the reflector reflects a portion of the incident light irradiating the processing region to generate reflected light, a spectrometer configured to receive the reflected light from the reflector through the viewing window and the optical source unit and a controller configured to determine density of the active species gas within the processing region in relation to the incident light and the reflected light.

20 Claims, 17 Drawing Sheets

(58) Field of Classification Search
CPC ......... G01J 3/0291; G01N 9/24; G01N 21/25; G02B 5/08
USPC ....... 216/59, 60; 427/8; 204/192.13, 298.03; 156/345.24; 118/712
See application file for complete search history.

(56) References Cited

U.S. PATENT DOCUMENTS

| | | | |
|---|---|---|---|
| 11,114,286 B2 | 9/2021 | Lin et al. | |
| 11,114,350 B2 | 9/2021 | Wu et al. | |
| 2018/0364156 A1* | 12/2018 | Atanasoff | H01J 37/32972 |
| 2023/0298872 A1* | 9/2023 | Au | H01J 37/32926 700/121 |

FOREIGN PATENT DOCUMENTS

| | | | | |
|---|---|---|---|---|
| JP | 2016213328 A | 12/2016 | | |
| KR | 20180014348 A | 2/2018 | | |
| KR | 102025873 B1 | 9/2019 | | |
| WO | WO-2020142451 A1 * | 7/2020 | ........... | C23C 14/564 |

\* cited by examiner

PLASMA PROCESSING APPARATUS AND METHOD OF MANUFACTURE

CROSS-REFERENCE TO RELATED APPLICATION

This application claims priority under 35 U.S.C. 119 from Korean Patent Application No. 10-2022-0062778 filed on May 23, 2022 in the Korean Intellectual Property Office, the subject matter of which is hereby incorporated by reference in its entirety.

BACKGROUND

1. Field of the Disclosure

The inventive concept relates generally to plasma processing apparatuses and methods of manufacture for semiconductor devices.

2. Description of the Related Art

Fabrication processes (or treatments) using plasma (hereafter generically referred to as, "plasma process(es)") have been used during the manufacture of semiconductor devices, plasma display panels (PDPs), liquid crystal displays (LCDs), solar cells, and the like. In this regard, plasma processes include, for example, certain dry etching processes, Plasma Enhanced Chemical Vapor Deposition (PECVD) processes, as well as sputtering, ashing, and cleaning processes. Further in this regard, various forms, or types, of plasma may be used in relation to plasma processes, such as Capacitively Coupled Plasma (CCP), Inductively Coupled Plasma (ICP), mixed CCP/ICP, Helicon plasma, Microwave plasma, and the like. The fabricating characteristics of respective plasma processes are a function of various plasma variables, such as for example, electron density, electron temperature, ion linear velocity, and ion energy. In particular, plasma density greatly affects processing performance, manufacturing yield, and product reliability.

SUMMARY

Embodiments of the inventive concept provide methods of manufacture for semiconductor devices using a plasma processing apparatus exhibiting improved integration density (or degree of integration). Other embodiments of the inventive concept provide plasma processing apparatuses exhibiting improved integration density.

According to embodiments of the inventive concept, there is provided a method of manufacture for a semiconductor device. The method includes; loading a substrate into a plasma processing apparatus including a housing, performing a plasma process on the substrate, and determining density of an active species gas within the plasma processing apparatus, wherein the determining of the density of the active species gas within the plasma processing apparatus includes; irradiating a processing region within the housing with incident light, receiving reflected light from a reflector disposed within the housing in response to the incident light, and determining the density of the active species gas within the plasma processing apparatus in relation to the incident light and the reflected light.

According to embodiments of the inventive concept, there is provided a plasma processing apparatus including; a housing including a first side wall and a second side wall, wherein the housing defines a processing region in which a plasma process is performed, an optical source unit disposed on the first side wall of the housing, wherein the optical source unit is configured to irradiate the plasma processing region with incident light through a viewing window formed in the housing during the performing of the plasma process, a reflector disposed on the second side wall of the housing, wherein the reflector reflects a portion of the incident light irradiating the processing region to generate reflected light, a spectrometer configured to receive the reflected light from the reflector through the viewing window and the optical source unit, and a controller configured to determine density of the active species gas within the processing region in relation to the incident light and the reflected light.

According to embodiments of the inventive concept, there is provided a plasma processing apparatus including; a housing including a bottom surface, a top surface, a first side wall and a second side wall surface, wherein an interior of the housing defines a processing region, shower head disposed within the interior of the housing to divide the processing region into a plasma region in which plasma is generated and an active species region in which an active species gas is applied to a substrate, a viewing window formed in the first side wall of the housing, an optical source unit covering the viewing window, including a collimator and configured to generate incident light irradiating the active species region at a wavelength band ranging from about 900 nm to about 1800 nm through the viewing window, a reflector disposed on an interior of the second side wall, laterally aligned with the viewing window and configured to reflect a portion of the incident light irradiating the active species region to generate reflected light, a spectrometer configured to receive the reflected light from the reflector through the viewing window and the optical source unit, and a controller configured to calculate density of the active species gas within the active species region in relation to a first intensity of the incident light and a second intensity of the reflected light, wherein the collimator is configured to control a forward direction of the incident light from the optical source unit to the reflector and a reverse direction of the reflected light from the reflector to the optical source unit, and a diameter of the collimator is the same as a diameter of the reflector.

BRIEF DESCRIPTION OF THE DRAWINGS

Advantages, benefits and features, as well as the making and use of the inventive concept will become more apparent upon consideration of the following detail description together with the accompanying drawings, in which.

DETAILED DESCRIPTION

Throughout the written description and drawings, like reference numbers and labels are used to denote like or similar elements, components, features and/or method steps.

Figure 1:
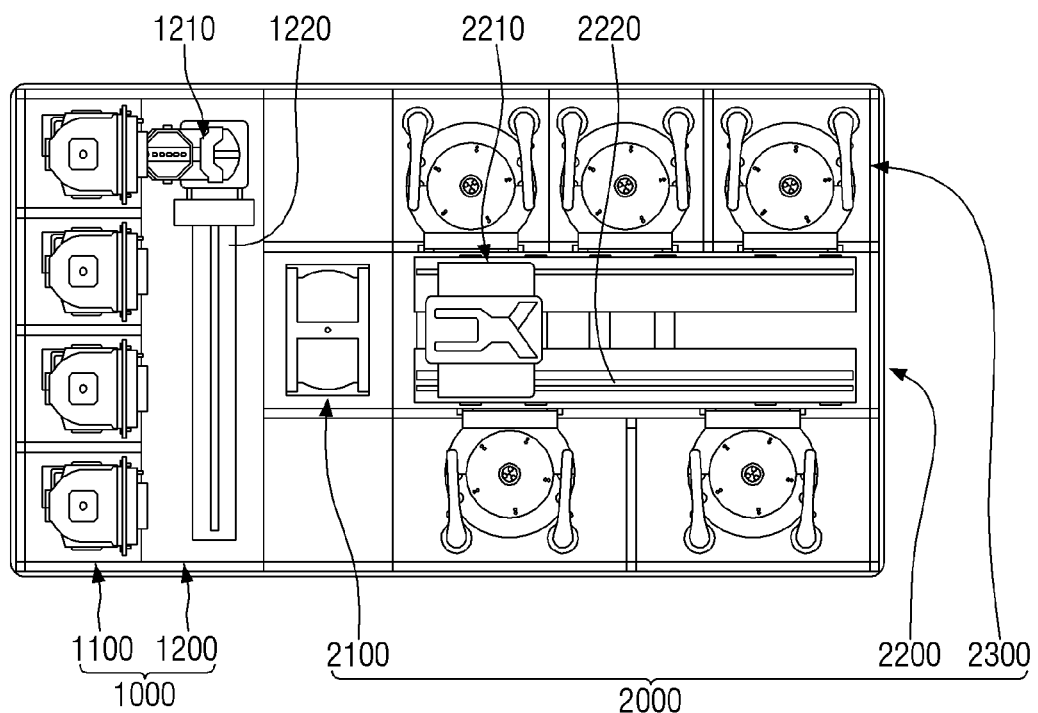
FIG. 1 is a plan diagram illustrating a plasma processing apparatus according to embodiments of the inventive concept.

Figure (FIG. 1 is a plan diagram illustrating a plasma processing apparatus according to embodiments of the inventive concept.

Here, the plasma processing system generally includes an index module 1000 and a process module 2000, wherein the index module 1000 receives an externally-provided substrate, and thereafter transports (or moves) the substrate into the process module 2000. The process module 2000 may then be used to perform one or more plasma process(es), such as for example, a cleaning process, a deposition process, and/or an etching process.

Accordingly, the index module 1000 may be understood as an equipment front end module (EFEM) including at least one load port 1100 accommodating the substrate and a transport frame 1200. In some embodiments, the substrate may be disposed in a container (e.g., a front opening unified pod or (FOUP)) designed to fit into the load port 1100. In this regard, the container may be loaded to and/or unloaded from the load port 1100 using one or more overhead transport mechanism(s) (not shown). Once the container containing the substrate has been loaded via the load port 1100, the transport frame 1200 may be used to transport the substrate between the loaded container and the process module 2000.

The process module 2000 may then be used perform one or more fabrication process(es) on the substrate. In some embodiments, the process module 2000 may include a buffer chamber 2100, a transport chamber 2200, and a process chamber 2300.

The buffer chamber 2100 provides a space temporarily accommodating the substrate as it is transported between the index module 1000 and the process module 2000. For example, the buffer chamber 2100 may provide a buffer slot in which the substrate may be disposed. A transport robot 2210 associated with the transport chamber 2200 may be used to remove the substrate from the buffer slot and then transport it to the process chamber 2300 which may also include a plurality of buffer slots. In this regard, the transport chamber 2200 may include a transport robot 2210 and transport rails 2220, wherein the transport robot 2210 moves along the transport rails 2220 during transport of the substrate.

In some embodiments, the process chamber 2300 may be a plasma processing chamber configured to perform at least one plasma process on the substrate (e.g., a cleaning process and/or an etching process).

Accordingly the process chamber 2300 may be disposed to one side of the transport chamber 2200. In other embodiments, another process chamber 2300 may be disposed on the opposing side of the transport chamber 2200. That is, multiple process chambers 2300 may be disposed on opposing sides of the transport chamber 2200.

Those skilled in the art will appreciate that a number of process chambers 2300 may be included and variously arranged in relation to the process module 2000, and that the scope of the inventive concept is not limited to any particular type, arrangement or operating approach associated with the process chamber 2300 and the transport chamber 2200.

Figure 2:
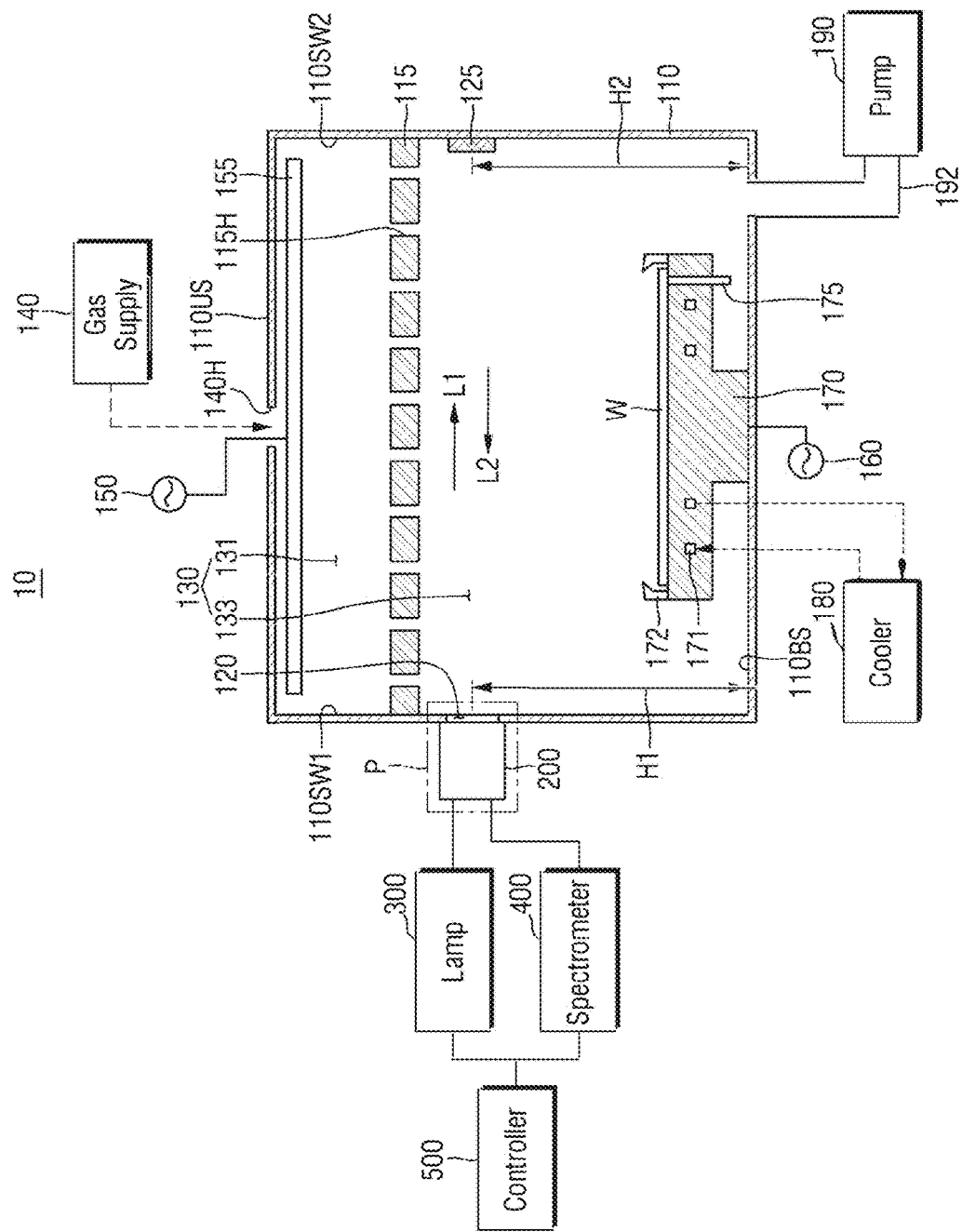
FIG. 2 is a cross-sectional diagram illustrating in one example a plasma processing apparatus according to embodiments of the inventive concept.
Figure 3:
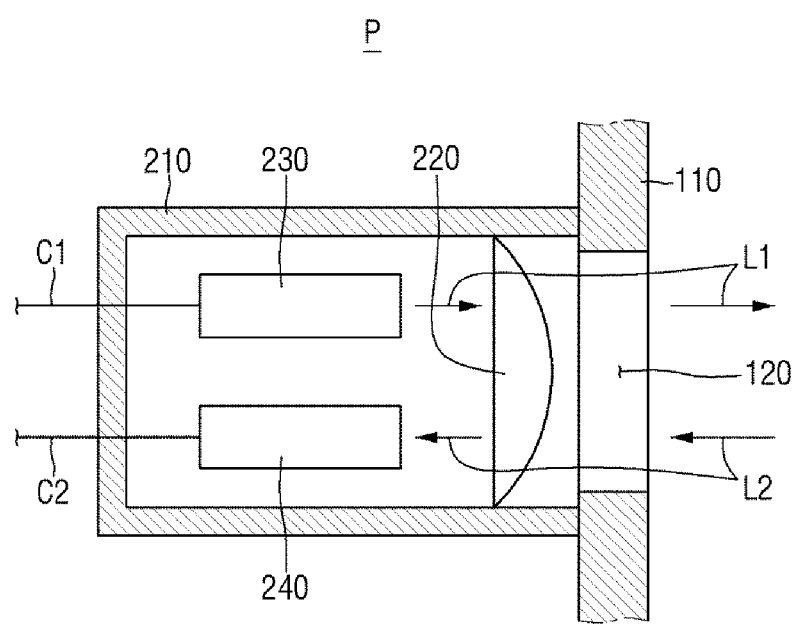
FIG. 3 is an enlarged view of region 'P' indicated in FIG. 2.

FIG. 2 is a cross-sectional diagram further illustrating in one embodiment a plasma processing apparatus 10 according to embodiments of the inventive concept, and FIG. 3 is an enlarged view further illustrating the region 'P' indicated in FIG. 2.

Referring to FIGS. 2 and 3, the plasma processing apparatus 10 may include a housing 110, a shower head 115, a viewing window 120, a reflector 125, an optical source unit 200, an optical source unit 300, a spectrometer 400, and a controller 500.

Here, the plasma processing apparatus 10 may include various equipment configured to perform a plasma processing on a substrate W. In some embodiments, the plasma processing apparatus 10 may be a rectangular chamber configured to perform various plasma-based semiconductor fabrication process(es), such as etching process(es) and/or cleaning process(es) on the substrate W. Further in this regard, it should be noted that it is common in the industry to name (or designate) fabrication equipment in accordance with one or more process(es) currently being performed by the fabrication equipment, whereas the fabrication equipment may be readily reconfigured to perform some other process(es).

As used herein, the term "substrate" is used to denote a substrate itself, a stacked structure including the substrate and one or more material layer(s) or film(s) disposed on a surface of the substrate. Further, the phrase "surface of the substrate" is used to denote an exposed surface of the substrate itself, or an exposed surface of the stacked structure disposed on an exposed surface of the substrate. For example, the substrate may be a wafer or include a wafer and at least one material film formed on the wafer. The material film may be, for example, an insulating film (e.g., an oxide film, a nitride film, an oxynitride film) and/or a conductive film (e.g., a metal film, a polysilicon film) formed on the wafer using various semiconductor fabrication processes, such as deposition, coating and/or plating processes. The material film may be a single film or multiple films formed on the wafer, and the material film may be formed on the wafer with a predetermined pattern.

The housing 110 may define (e.g., encompass) a processing region 130 in which the plasma process is performed on the substrate W. In some embodiments, the processing region 130 may be completely sealed away from an external environment. Here, the external structure of the housing 110 may have a rectangular shape, a cylindrical shape, an elliptic cylinder shape, or a polygonal cylinder shape. The housing 110 may generally include one or more metal material(s) or structures that are electrically grounded in order to reduce the influence of external electrical noise on the plasma processing.

In some embodiments, the housing 110 may include a bottom (or lower surface) 110BS and an opposing top (or upper surface) 110 separated by at least two side walls (e.g., a first side wall and an opposing second side wall). Each of the bottom, top and side walls of the housing 110 may be further understood as having an interior surface and an exterior surface.

The processing region 130 may be understood as a region interior to the housing 110 and including at least a plasma region 131 and an active species region 133, wherein the plasma region 131 and the active species region 133 may be separated by the shower head 115. In this regard, plasma may be generated (or provided) in the plasma region 131 and an active species gas may be provided to the active species region 133. For example, plasma may initially be provided in the plasma region 131, and then converted into an active species gas through the shower head in order to be provided to the active species region 133.

Although not shown in FIG. 2, a liner may be provided (wholly or in part) within the interior of the housing 110 to protect certain constituent components of the housing 110 (e.g., metal structures within the housing 110) from damage or contamination during plasma processing. For example, the liner may be formed of one or more metal material(s), such as aluminum or a ceramic material. That is, the liner may be formed of a material resistant to the plasma provided in the plasma region 131 and/or the active species region 133, such as for example, a yttrium oxide ($Y_2O_3$) film.

The housing 110 may be connected to an exhaust pump 190 through a discharge pipe 192. By-products associated with plasma processing may be exhausted through the discharge pipe 192 using the exhaust pump 190. Further, the exhaust pump 190 may be used to control the pressure within the housing 110.

The plasma processing apparatus 10 may further include a gas supply unit 140 installed external to the housing 110. The gas supply unit 140 may be used to selectively supply various gas(es) to the interior of the housing 110. For example, a gas hole 140H may be provided in the upper surface 110US the housing 110, wherein the various gas(es) associated with plasma processing may be introduced into the housing 110 through the gas hole 140H.

An electrode plate 155 may be provided within the housing 110, wherein the electrode plate 155 is connected to a radio frequency (RF) source 150. In some embodiments, the electrode plate 155 may be disposed proximate the upper surface 110US of the housing 110. The RF source 150 may be used to apply electromagnetic power to the electrode plate 155 in order to generate plasma in the plasma region 131. For example, plasma may be generated by applying RF power to the gas(es) supplied through the gas supply unit 140. In this regard, the RF power may be defined by an intensity (or intensity range) and a frequency (or frequency range). In some embodiments, the RF power may be generated in response to applied RF power having a defined ON/OFF cycle. Alternately, the RF power may be defined in relation to a continuously RF power.

Those skilled in the art will recognize that a plasma is understood to include various constituents, such as radicals, ions, electrons, and ultraviolet rays. At least one of these constituents may be effectively used during plasma processing (e.g., etching, cleaning and/or deposition process(es)) applied to the substrate W. In this regard, radicals are electrically neutral, whereas ions have an electrical polarity. Accordingly, radicals may accelerated to isotropically impact material(s) to be cleaned (or etched) during plasma etching or plasma cleaning processes. Additionally, radicals may be used to hinder or inhibit the deposition of particular constituents during a plasma deposition process. Alternately or additionally, ions may be used to anisotropically remove material(s) to be cleaned during a plasma cleaning process or a plasma etching process.

As noted above, the shower head 115 may be variously installed within the housing 110, and may include a plurality of holes 115H through which gas may flow. The shower head 115 may be used to functionally divide an upper the plasma region 131 from a lower active species region 133. Further, the shower head 115 may be used to convert plasma into activated species gases as noted above. Hence, plasma provided to the plasma region 131 may be converted into active species gas through the holes 115H of the shower head 115 and supplied to the active species region 133.

A viewing window 120 may be formed in one of the side walls (e.g., the first side wall 110SW1) of the housing 110. Of note, another viewing window is not installed in the opposing second side wall 110SW2 in order to maximize (or least intrude upon) the useful interior space within the housing 110. Such expanded and unencumbered interior space facilitates more (or larger) processing equipment and greater flexibility in equipment disposition. Further, an overall footprint of the housing 110 within a fabrication facility may be reduced.

The reflector 125 may be disposed on the second side wall 110SW2 of the housing 110 opposite to (or opposing) the first side wall 110SW1. The reflector 125 may be disposed in lateral alignment with the viewing window 120, such that the reflector 125 may effectively reflect incident light L1 introduced through the viewing window 120 from the optical source unit 300. In this regard, the incident light L1 generated by the optical source unit 300 may be emitted into the processing region 130 (e.g., the active species region 133) through the viewing window 120 and reflected by the reflector 125 to generate reflected (or returned) light L2. The reflected light L2 may then be captured and then provided to the spectroscope 400.

Accordingly, the reflector 125 may include at least one material that efficiently reflects the incident light L1. In some embodiments, the reflector 125 may include, for example, at least one of silicon (Si) series materials, $Y_2O_3$, and $YF_3$.

As assembled in relation to the housing 110, the reflector 125 may protrude inwardly from the interior of the second side wall 110SW2. Alternately, the reflector 125 may be flush-mounted on the second side wall 110SW2 of the housing 110, or protrude outwardly from the interior of the second side wall 110SW2 of the housing 110.

In some embodiments, a first height H1 from the bottom surface 110BS of the housing 110 to a nominal central portion of the viewing window 120 may be substantially the same as a second height H2 from the bottom surface 110BS of the housing 110 to a nominal central portion of the reflector 125. Accordingly, a forward (lateral) direction of the incident light L1 may be substantially parallel to that of a return (lateral) direction of the reflected light L2, both of which are substantially parallel to the bottom surface 110BS of the housing 110. In some embodiments, the forward direction of the incident light L1 and the return direction of the reflected light L2 may be directly aligned, yet oppositely directed.

Such configuration allows the spectroscope 400 to detect the reflected light L2 and provide a corresponding signal to the controller 500 indicative of the reflected light L2 (e.g., a detected intensity of the reflected light L2). In response to the corresponding signal, the controller 500 may determine (e.g., calculate) a density of active species gas in the active species region 133 in relation to a first (e.g., as generated) intensity of the incident light L1 and a second (e.g., as detected) intensity of the reflected light L2. One example of this gas density determination approach will be described hereafter in some additional detail.

The optical source unit 300 may provide (e.g., generate) the incident light L1 with a defined intensity and within a defined first wavelength band. Here, for example, the first wavelength band may include wavelengths ranging from between about 900 nm and to about 1800 nm. The optical source unit 300 may be variously configured to include at least one light generating element(s), such as for example, a xenon lamp, a tungsten halogen lamp, and a white light-emitting diode. Hereafter, certain illustrative embodiments of the inventive concept are assumed to include a xenon lamp.

Thus, electromagnetic energy selectively generated by the optical source unit 300 (e.g., the incident light L1) may be communicated (or transmitted) to the optical source unit 200, wherein the optical source unit 200 may thereafter direct (or focus) the incident light L1 into the processing region 130. That is, the incident light L1 may be directionally emitted into the processing region 130 (e.g., the active species region 133) through the viewing window 120.

The optical source unit 200 may further include element(s) configured to detect (or capture the reflected light L2 received from the reflector 125 through the viewing window 120.

Referring to FIG. 3, the optical source unit 200 may include a body unit 210, a collimator 220, an irradiation unit 230 and a light-receiving unit 240.

The body unit 210 may be configured to completely cover (or encompass) the viewing window 120. The body unit 210 may be made of one or more heat-resistant material(s) that will not deform or warp when exposed to high heat, or allow thermal energy to pass to/from the housing 110. In this regard, for example, the body unit 210 may be mechanically coupled to the exterior of the first side wall 110SW1 of the housing 110 using bolts and nuts, screws and/or adhesive(s).

The collimator 220 may be disposed at the front end of the optical source unit 200, and may be installed and aligned in relation to the viewing window 120. The collimator 220 may include, but not limited to, at least one lens. The collimator 220 may be configured to control and maintain the forward direction of the incident light L1 and/or the return direction of the reflected light L2. In some embodiments, the collimator 220 may include a condensing lens designed to effectively concentrate (or condense) the reflected light L2 onto the optical source unit 200. Alternately, the collimator 220 may include a relatively wide-angle lens (or lens assembly) capable of capturing and condensing the reflected light L2 over a relatively wide angle of view.

In some embodiments, the diameter of the collimator 220 may be substantially the same as the diameter of the reflector 125. That is, a region emitting the incident light L1 and a region reflecting the reflected light L2 may be substantially the same size. Accordingly, condensing efficiency associated with the reflected light L2 may be maximized.

The irradiation unit 230 may be used to emit the incident light L1, and the light-receiving unit 240 may be used to capture the reflected light L2. In this regard, the irradiation unit 230 may receive the incident light L1 (or a signal corresponding to the incident light L1) from the optical source unit 300 through a first optical fiber C1, and emit the incident light L1 into the processing region 130 (e.g., the active species region 133). The light-receiving unit 240 may be used to capture the reflected light L2, as condensed by the collimator 220, and communicate the captured reflected light L2 (or a signal corresponding to the reflected light L2) to the spectroscope 400 through a second optical fiber C2.

Referring FIG. 2, the plasma processing apparatus 10 may further include a substrate support unit 170 mechanically supporting the substrate W. Here, the substrate support unit 170 may be installed within the housing 110 to be disposed substantially within the processing region 130 (e.g., the active species region 133).

The substrate support unit 170 may include an electro-static chuck to fix the substrate W with an electro-static force and a corresponding chuck support. The electrostatic chuck may include an electrode for chucking and de-chucking the substrate W. That is, the chuck support may support the electrostatic chuck disposed thereon, and may be formed of a metal such as aluminum or a ceramic insulator such as alumina. A heating member, such as a heater, may be disposed within the chuck support, such that heat from the heater may be effectively transferred to the electrostatic chuck and/or the substrate W. Also, a power application wiring connected to the electrode of the electrostatic chuck may be disposed on the chuck support. Those skilled in the art will recognize that the configuration of the substrate support unit 170 may vary by design and processing operation. For example, the substrate support unit 170 may include a vacuum chuck fixing the substrate W with a vacuum, or a mechanical chuck fixing the substrate W with mechanical force.

The substrate support unit 170 may further include a lift pin 175 used to safely lift the substrate W from the surface of the substrate support unit 170. The lift pin 175 may be disposed in a recess in the substrate support unit 170. Thus, the lift pin 175 may be installed to be vertically movable with respect to the substrate support unit 170. The lift pin 175 may move vertically to raise and lower the substrate W. The substrate support unit 170 may include a suitable number of lift pins 175 supporting the substrate W thereon. For example, the substrate support unit 170 may include, but not limited to, three or more lift pins 175 evenly spaced around a circumference of the substrate support unit 170.

The lift pin 175 may enter a pin-up state wherein it protrudes upward from the substrate support unit 170 to support the substrate W while the substrate W when loaded in the plasma processing apparatus or unloaded from the plasma processing apparatus. Further, while the substrate W is being processed in the processing region 130, the lift pin 175 may enter a pin-down state wherein it is lowered below the upper surface of the substrate support unit 170 so that the substrate W may be disposed on the substrate support unit 170.

An RF bias 160 may be connected to the substrate support unit 170. The RF bias 160 may be used to apply RF power to the substrate support unit 170. In some embodiments, the RF bias 160 may apply RF power at a relatively low frequency (e.g., about 200 kHz) to the substrate support unit 170 during a plasma process is being performed on the substrate W. In some embodiments, the RF bias 160 may selectively remove the RF power supplied to the substrate support unit 170 at times during the plasma process is being performed on the substrate W.

In some embodiments, the substrate support unit 170 may further include a cooling channel 171 and/or a rim 172.

The cooling channel 171 may be connected to the cooling device 180 and may be used to cool the substrate support unit 170. The cooling device 180 may supply a cooling fluid to the cooling channel 171 of the substrate support unit 170. The cooling channel 171 of the substrate support unit 170 is a passage through which a cooling fluid may flow, and may have a shape of a concentrical or helical pipe around the central axis of the substrate support unit 170. The cooling device 180 may be variously used to control the temperature, flow rate, flow velocity, and the like of the cooling fluid supplied to the cooling channel 171 of the substrate support unit 170, thereby controlling the temperature of the substrate support unit 170 and the temperature of the substrate W mounted on the substrate support unit 170.

The cooling fluid may include one or more material(s) that effectively provide thermal transfer over a wide range of temperatures. For example, the cooling fluid may include at least one of water, ethylene glycol, silicone oil, liquid Teflon, etc. The cooling device 180 may be used to control the temperature of the cooling fluid within a defined cryogenic temperature range. Alternately, the cooling device 180 may be used to maintain temperature of the cooling fluid at room temperature.

The rim 172 may be provided on the substrate support unit 170. Here, the rim 172 may at least partially wrap an edge portion of the substrate W disposed on the substrate support unit 170. In this manner, the rim 172 may prevent the substrate W from laterally moving across the substrate support unit 170. In order to withstand temperatures, corrosion and/or deterioration associated with plasma processing, the rim 172 may include a ceramic material.

Additional plasma processing apparatuses consistent with embodiments of the inventive concept will now be described in relation to FIGS. 4, 5, 6, 7, 8, 9, 10, 11 and 12. For brevity of explanation, these additional embodiments will be described primarily in relation to differences with (or addition(s) to) the previously described embodiments of FIGS. 2 and 3.

Figure 4:
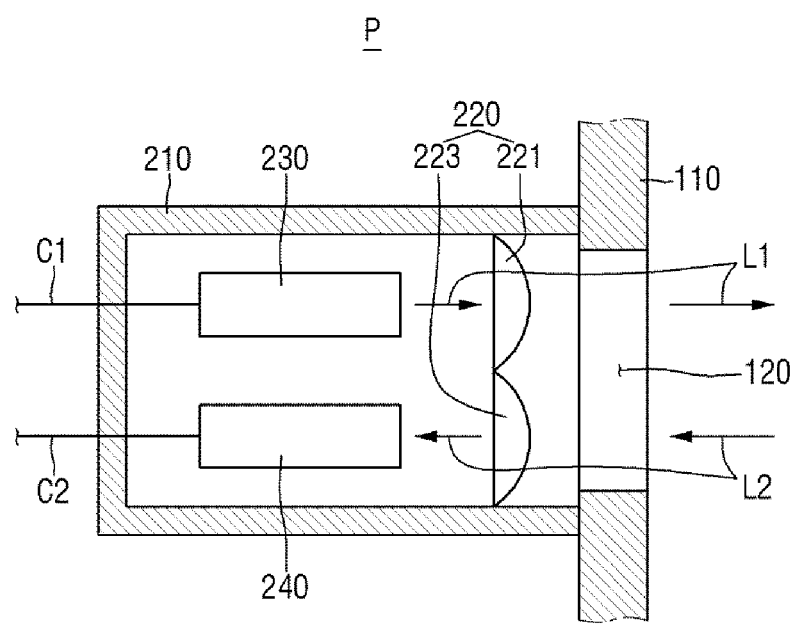
FIG. 4 is a conceptual diagram further illustrating a plasma processing apparatus according to embodiments of the inventive concept.

FIG. 4 is another enlarged view of the region P indicated in FIG. 2 and may be compared with FIG. 3.

Referring to FIG. 4, the single-element collimator 220 of FIG. 3 may be replaced a first sub-collimator 221 and an adjacently disposed second sub-collimator 223. The first sub-collimator 221 may be used to control the forward direction of the incident light L1 as provided by the irradiation unit 230, whereas the second sub-collimator 223 may be used to control the reverse direction of the reflected light L2. Thus, the first sub-collimator 221 may be laterally aligned with the irradiation unit 230 and the second sub-collimator 223 may be laterally aligned with the light-receiving unit 240.

Figure 5:
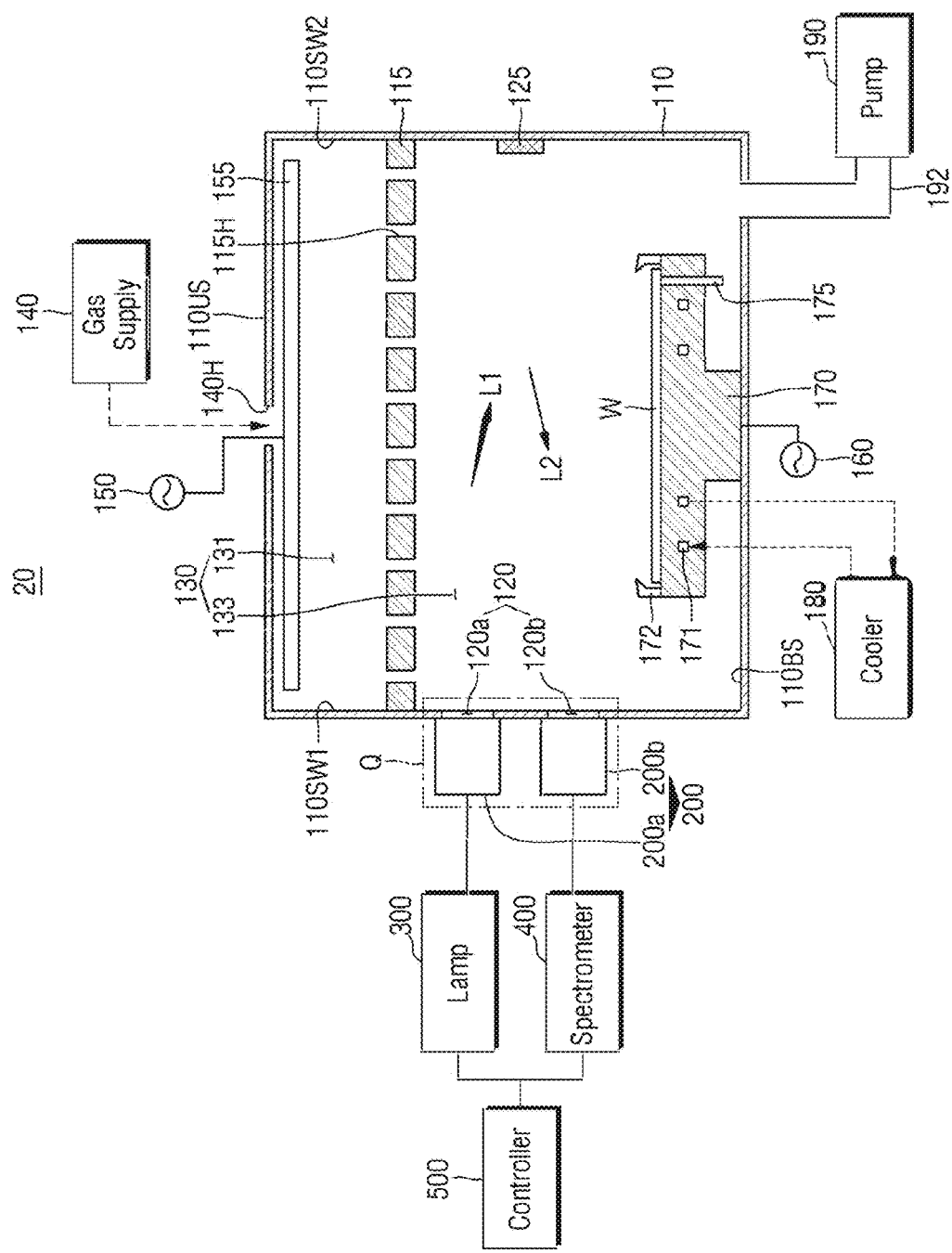
FIG. 5 is a cross-sectional diagram illustrating in another example the plasma processing of FIG. 1.
Figure 6:
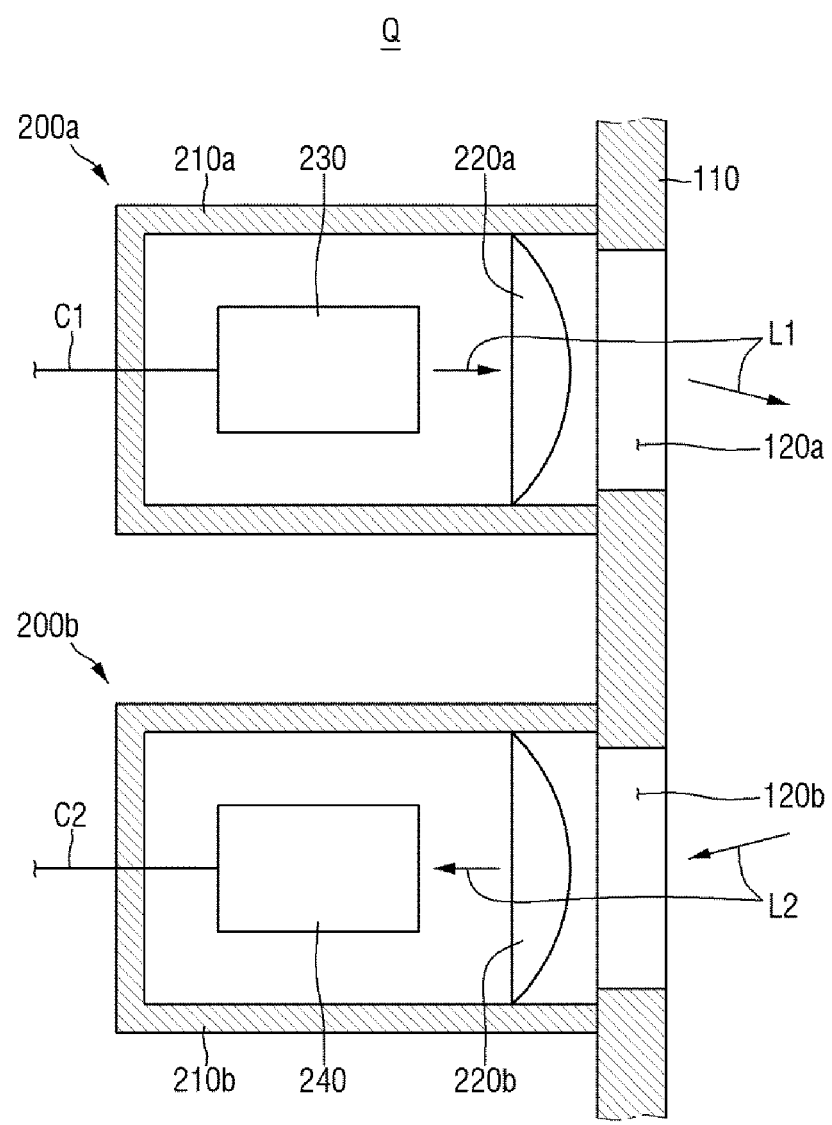
FIG. 6 is an enlarged view of region 'Q' indicated in FIG. 5.

FIG. 5 is a cross-sectional diagram illustrating in another example a plasma processing apparatus 20 according to embodiments of the inventive concept, and FIG. 6 is an enlarged view of region 'Q' indicated in FIG. 5.

Referring to FIGS. 5 and 6, the optical source unit 200 may separately include a first optical source unit 200a and a second optical source unit 200b, and the viewing window 120 may separately include a first viewing window 120a and a second viewing window 120b.

The first optical source unit 200a may be disposed in relation to the first viewing window 120a, and may be connected to the optical source unit 300. The first optical source unit 200a may include a first body unit 210a, a first collimator 220a, and an irradiation unit 230.

In some embodiments, the first body unit 210a may completely cover the first viewing window 120a. The first body unit 210a may be made of one or more heat-resistant material(s) that will not deform or warp under the influence of high heat or allow material heat transfer to/from the housing 110. The first body unit 210a may be mechanically coupled to the exterior of the first side wall 110SW1 of the housing 110 using, for example, bolts and nuts, screws and/or adhesive.

The first collimator 220a may be disposed at the front end of the first optical source unit 200a and may be aligned in relation to the first viewing window 120a. The first collimator 220a may include at least one lens. The first collimator 220a may be used to control and maintain the forward direction of the incident light L1. For example, the first collimator 220a may be used to direct (or focus) the incident light L1 towards the reflector 125.

The irradiation unit 230 may be used to emit the incident light L1 in response to a signal received from the optical source unit 300 through the first optical fiber C1. The irradiation unit 230 may emit the incident light L1 into the processing region 130 (e.g., the active species region 133).

The second optical source unit 200b may be disposed on the second viewing window 120b, and may also be connected to the spectroscope 400. The second optical source unit 200b may include a second body unit 210b, a second collimator 220b, and a light-receiving unit 240.

The second body unit 210b may completely cover the second viewing window 120b. The second body unit 210b may be made of one or more heat-resistant material(s) that will not deform or warp under the influence of high heat or allow material heat transfer to/from the housing 110. Here, the second body unit 210b may be mechanically coupled to the housing 110 using, for example, bolts and nuts, screws and adhesive.

The second collimator 220b may be disposed at the front end of the second optical source unit 200b. The second collimator 220b may be installed on the second viewing window 120b. The second collimator 220b may include at least one lens. The second collimator 220b may be used to control and maintain the return direction of the reflected light L2. For example, the second collimator 220b may be used to focus (or direct) the reflected light L2 towards the light-receiving unit 240. The light-receiving unit 240 may condense the reflected light L2. The light-receiving unit 240 may then communicate the condensed reflected light L2 to the spectroscope 400 through the second optical fiber C2.

In some embodiments, a height from the bottom surface 110BS of the housing 110 to the first viewing window 120a, a height from the bottom surface 110BS of the housing 110 to the second viewing window 120b, and a height from the bottom surface 110BS of the housing 110 to the reflector 125 may be different. For example, the height from the bottom surface 110BS of the housing 110 to the first viewing window 120a may be greater than the height from the bottom surface 110BS of the housing 110 to the second viewing window 120b. The height from the bottom surface 110BS of the housing 110 to the second viewing window 120b may be smaller than the height from the bottom surface 110BS of the housing 110 to the reflector 125. That is, the reflector 125 may be disposed at a height that is somewhere between a height of the first viewing window 120a and a height of the second viewing window 120b.

In some embodiments, within the active species region 133, the forward direction of the incident light L1 and the reverse direction of the reflected light L2 may be differently directed. That is, since the incident light L1 is emitted from the first viewing window 120a and directed towards the reflector 125, and the reflected light L2 is reflected by the reflector 125 towards the second viewing window 120b—and the height from the bottom surface 110BS of the housing 110 to the first viewing window 120a, the height from the bottom surface 110BS of the housing 110 to the second viewing window 120b, and the height from the bottom surface 110BS of the housing 110 to the reflector 125 are different, therefore the forward direction of the incident light L1 and the reverse direction of the reflected light L2 will be different.

Figure 7:
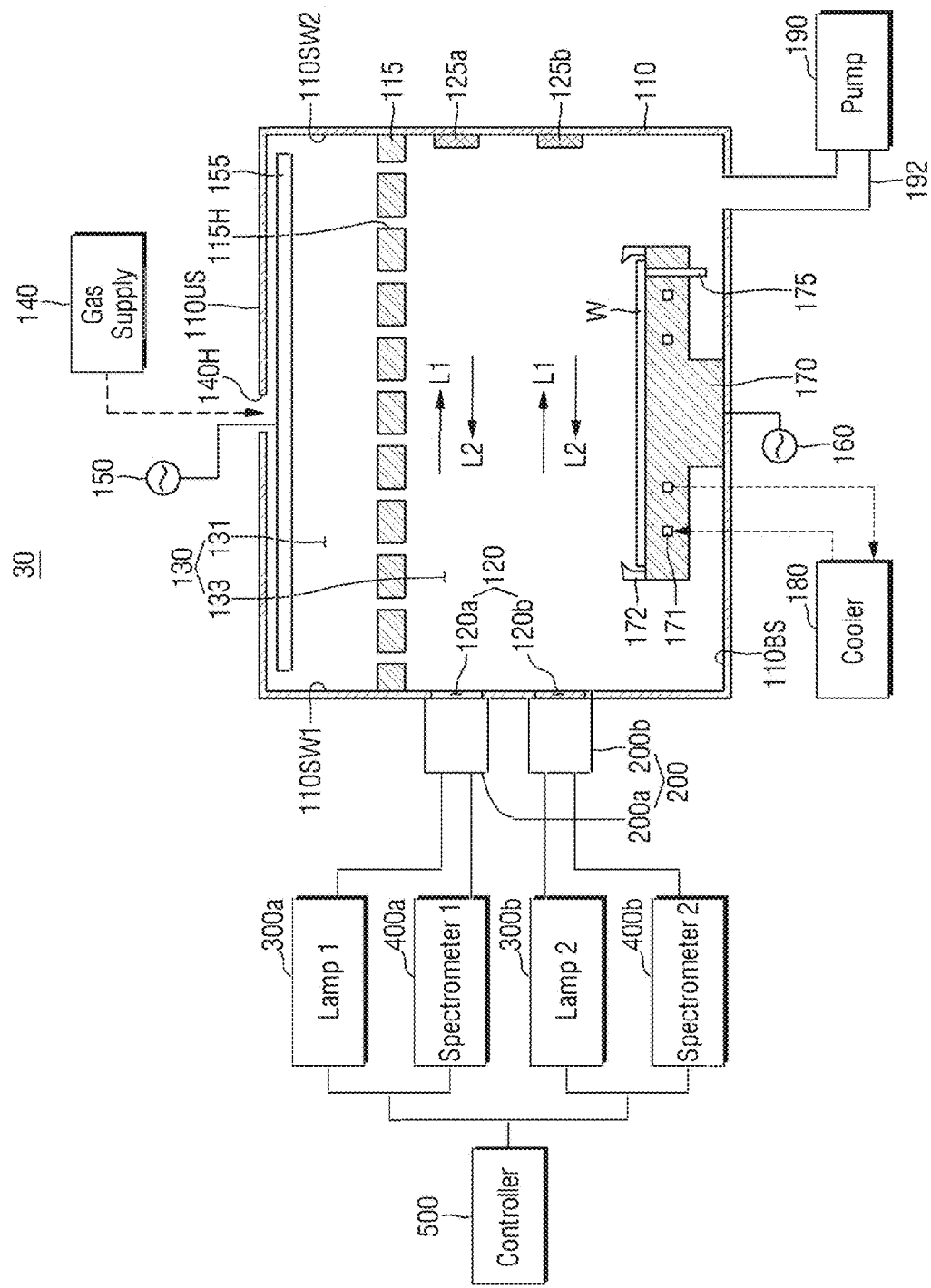
FIGS. 7 and 8 are respective cross-sectional diagrams illustrating plasma processing apparatuses according to embodiments of the inventive concept.
Figure 8:
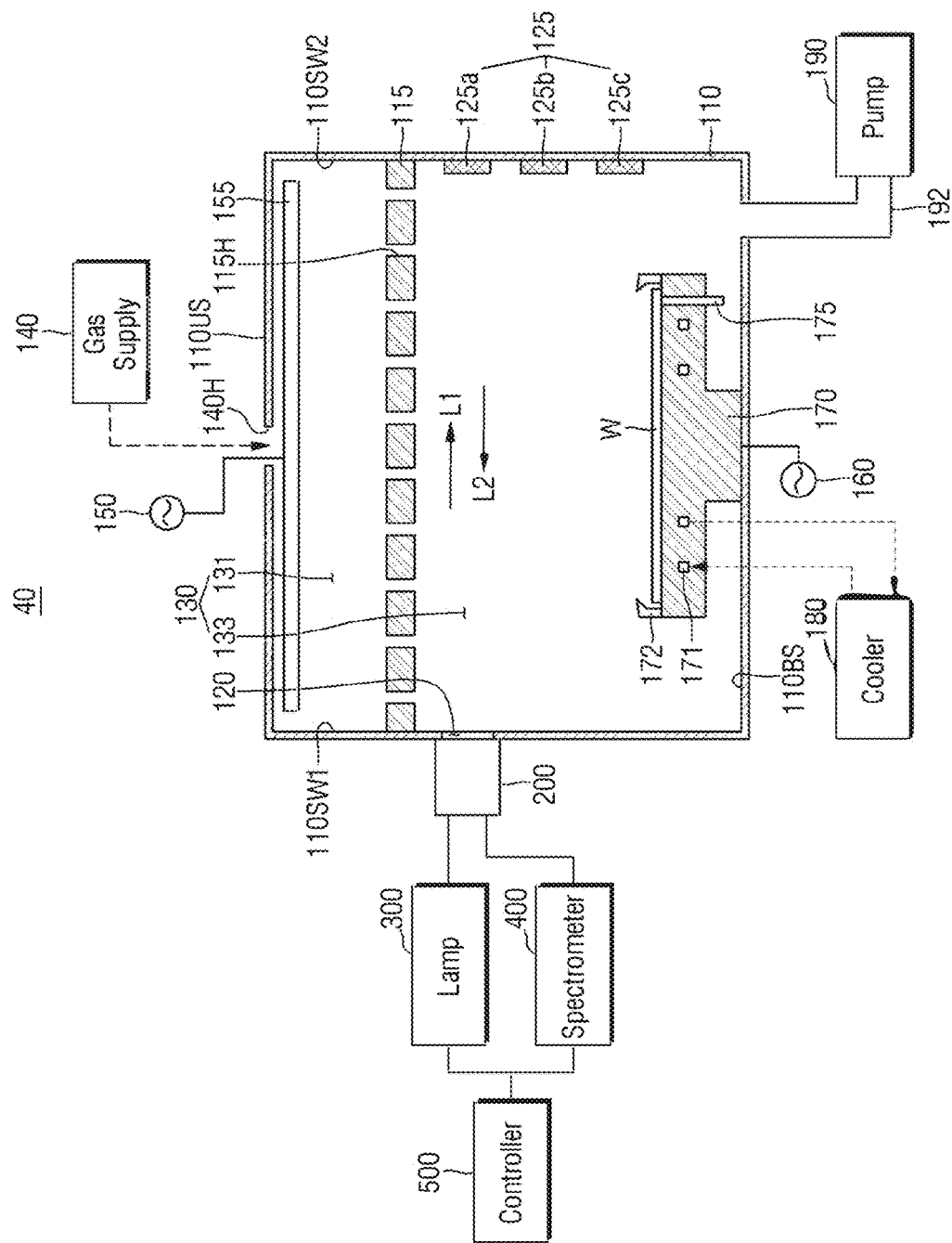

FIGS. 7 and 8 are cross-sectional diagrams respectively illustrating plasma processing apparatuses 30 and 40 according to embodiments of the inventive concept.

Referring to the plasma processing apparatus 30 of FIG. 7 by way of comparison with the plasma processing apparatus 20 of FIG. 5, the optical source unit 200 may include a first optical source unit 200a and a second optical source unit 200b; the optical source unit 300 may include a first optical source unit 300a and a second optical source unit 300b; the spectroscope 400 may include a first spectrometer 400a and a second spectrometer 400b; the viewing window 120 may include a first viewing window 120a and a second viewing window 120b; and, the reflector 125 may include a first reflector 125a and a second reflector 125b.

Here, the first optical source unit 200a may be laterally disposed in relation to the first viewing window 120a, and the first optical source unit 300a and the first spectroscope 400a may be connected to the first optical source unit 200a. Further, the first viewing window 120a may be disposed in lateral alignment with the first reflector 125a.

The second optical source unit 200b may be disposed in relation to the second viewing window 120b, and the second optical source unit 300b and the second spectroscope 400b may be connected to the second optical source unit 200b. Further, the second viewing window 120b may be disposed in lateral alignment with the second reflector 125b.

In some embodiments, the controller 500 may be used to variously control the operation of the first optical source unit 300a, the first spectroscope 400a, the second optical source unit 300b, and the second spectroscope 400b.

Of note in relation to the plasma processing apparatus 30 of FIG. 7, the density of the active species gas in the active species region 133 may be more accurately measured using multiple optical units 200, multiple optical source units 300, multiple spectroscopes 400, and multiple reflectors 125, as compared with the plasma processing apparatus 20 of FIG. 5.

Referring to FIG. 8, a plasma processing apparatus 40 according to embodiments of the inventive concept is substantially similar to the plasma processing apparatus 10 of FIG. 2, except for the inclusion of a plurality of reflectors 125 (e.g., a first reflector 125a, a second reflector 125b and a third reflector 125c) on the interior of the second side wall 110SW2 of the housing 110. In this regard, multiple, combined, and/or averaged measurements of gas density in the active species region 133 made in relation to the plurality of reflectors 125, each respectively disposed at a different vertical height along the interior of the second side wall 110SW2, may under certain circumstances prove more accurate than measurement(s) made by elements laterally aligned across the processing region 130. That is, the plurality of reflectors 125 may collectively operate to generate the reflected light L2.

Figure 9:
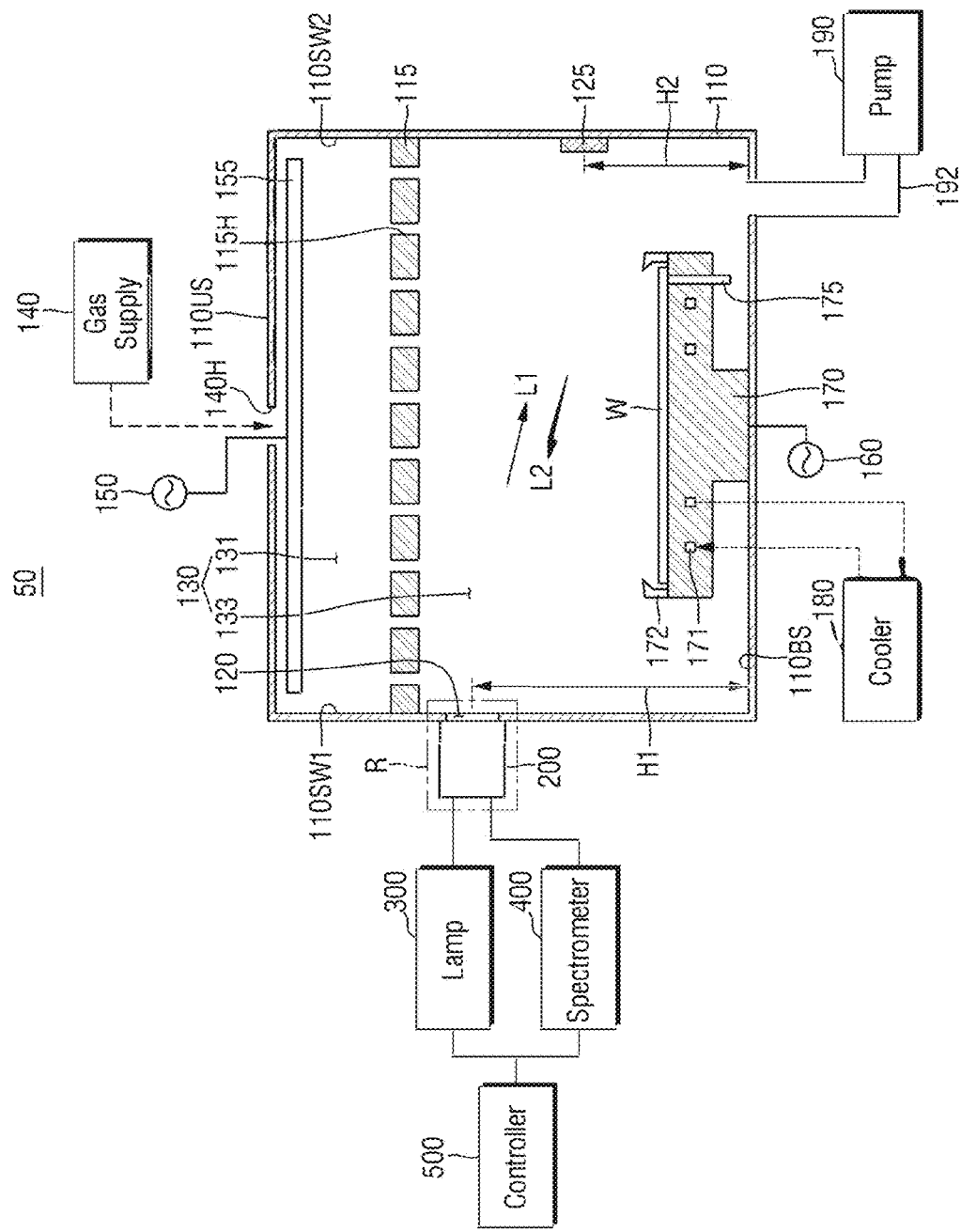
FIG. 9 is a cross-sectional diagram illustrating in still another embodiment a plasma processing apparatus according to embodiments of the inventive concept.
Figure 10:
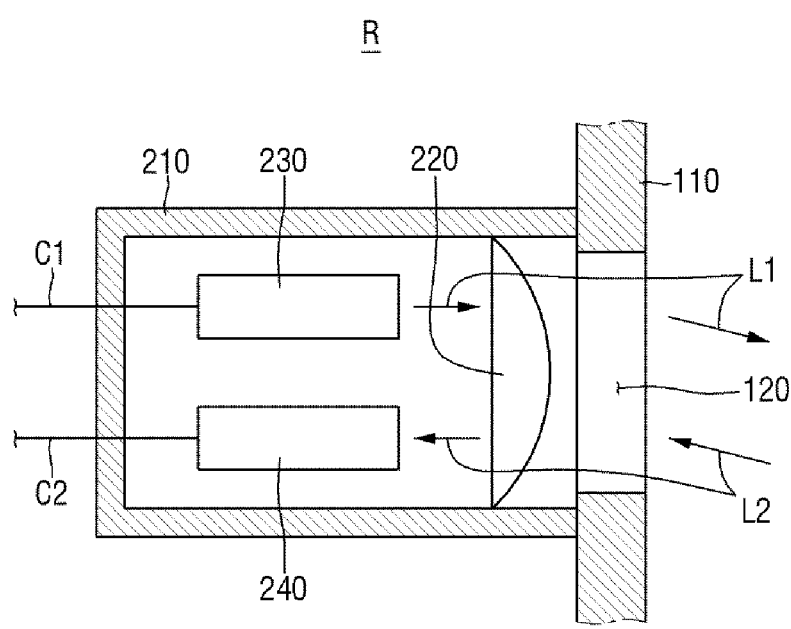
FIG. 10 is an enlarged view of region 'R' indicated in FIG. 9.

FIG. 9 is a cross-sectional diagram illustrating a plasma processing apparatus 50 according to embodiments of the inventive concept, and FIG. 10 is an enlarged view of a region 'R' indicated in FIG. 9.

Referring to FIGS. 9 and 10, a first height H1 from the bottom surface 110BS of the housing 110 to the viewing window 120 may be different from a second height H2 from the bottom surface 110BS of the housing 110 to the reflector 125.

For example, the first height H1 may be greater than the second height H2. Accordingly, neither the forward direction of the incident light L1 nor the reverse direction of the reflected light L2 is oriented in parallel with the bottom surface 110BS of the housing 110. However, the forward direction of the incident light L1 and the reverse direction of the reflected light L2 may be substantially aligned (e.g., in parallel) with each other. Thus, the incident light L1 may be diagonally directed downward from the optical source unit 200—disposed at a greater vertical height—towards the reflector 125—disposed at a lesser vertical height. This configuration results in the reflected light L2 being diagonally re-directed (or reflected) from the reflector 125 upwards towards the optical source unit 200.

Figure 11:
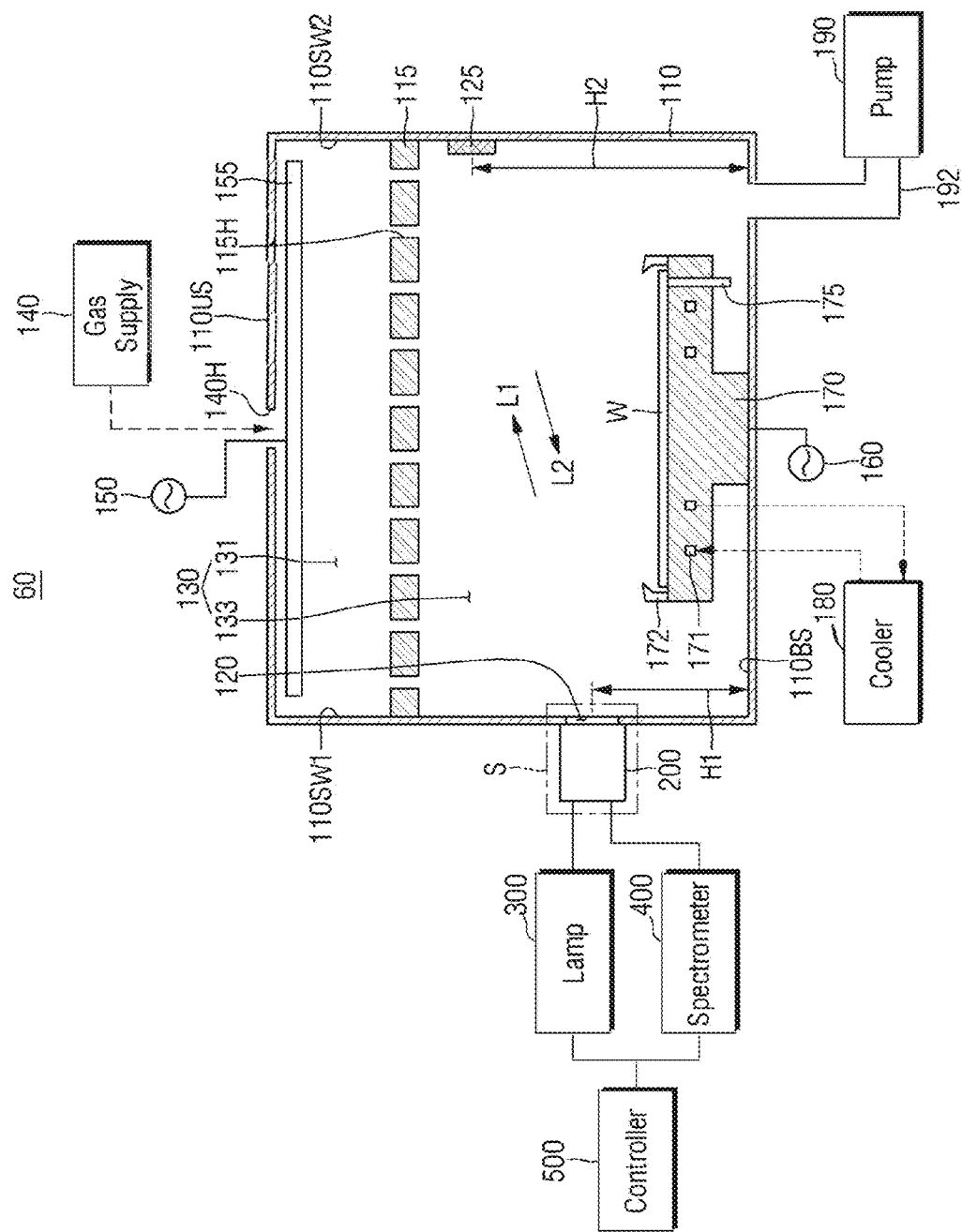
FIG. 11 is a cross-sectional diagram illustrating in still another embodiment a plasma processing apparatus according to embodiments of the inventive concept.
Figure 12:
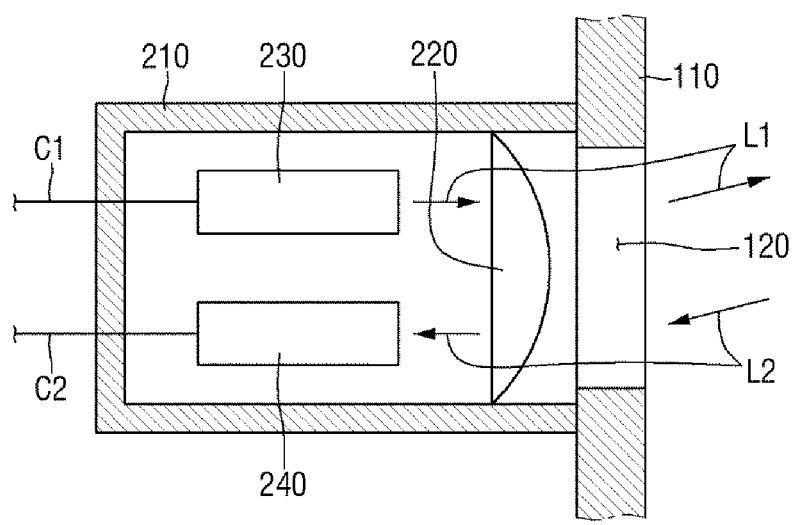
FIG. 12 is an enlarged view of region 'S' indicated in FIG. 11.

FIG. 11 is a cross-sectional diagram illustrating a plasma processing apparatus 60 according to embodiments of the inventive concept, and FIG. 12 is an enlarged view of a region 'S' indicated in FIG. 11.

Here, the embodiment of FIGS. 11 and 12 is analogous to the embodiment of FIGS. 9 and 10, expect that the first height H1 is less than the second height H2. Accordingly, neither the forward direction of the incident light L1 nor the reverse direction of the reflected light L2 is oriented in parallel with the bottom surface 110BS of the housing 110. However, the forward direction of the incident light L1 and the reverse direction of the reflected light L2 may be substantially aligned with each other. Thus, the incident light L1 may be diagonally directed upward from the optical source unit 200—disposed at a lesser vertical height—towards the reflector 125 disposed at a greater vertical lesser height. This configuration results in the reflected light L2 being diagonally re-directed (or reflected) from the reflector 125 downwards towards the optical source unit 200.

Figure 13:
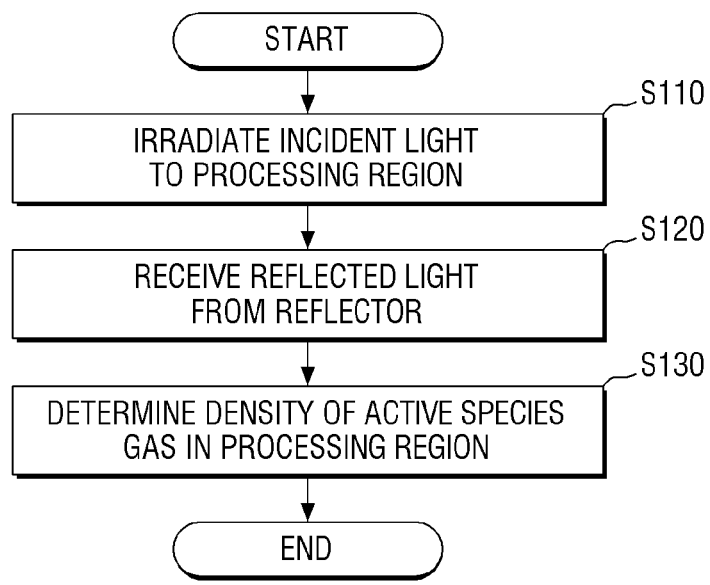
FIG. 13 is a flowchart illustrating in one embodiment a method of manufacture according to embodiments of the inventive concept.
Figure 14:
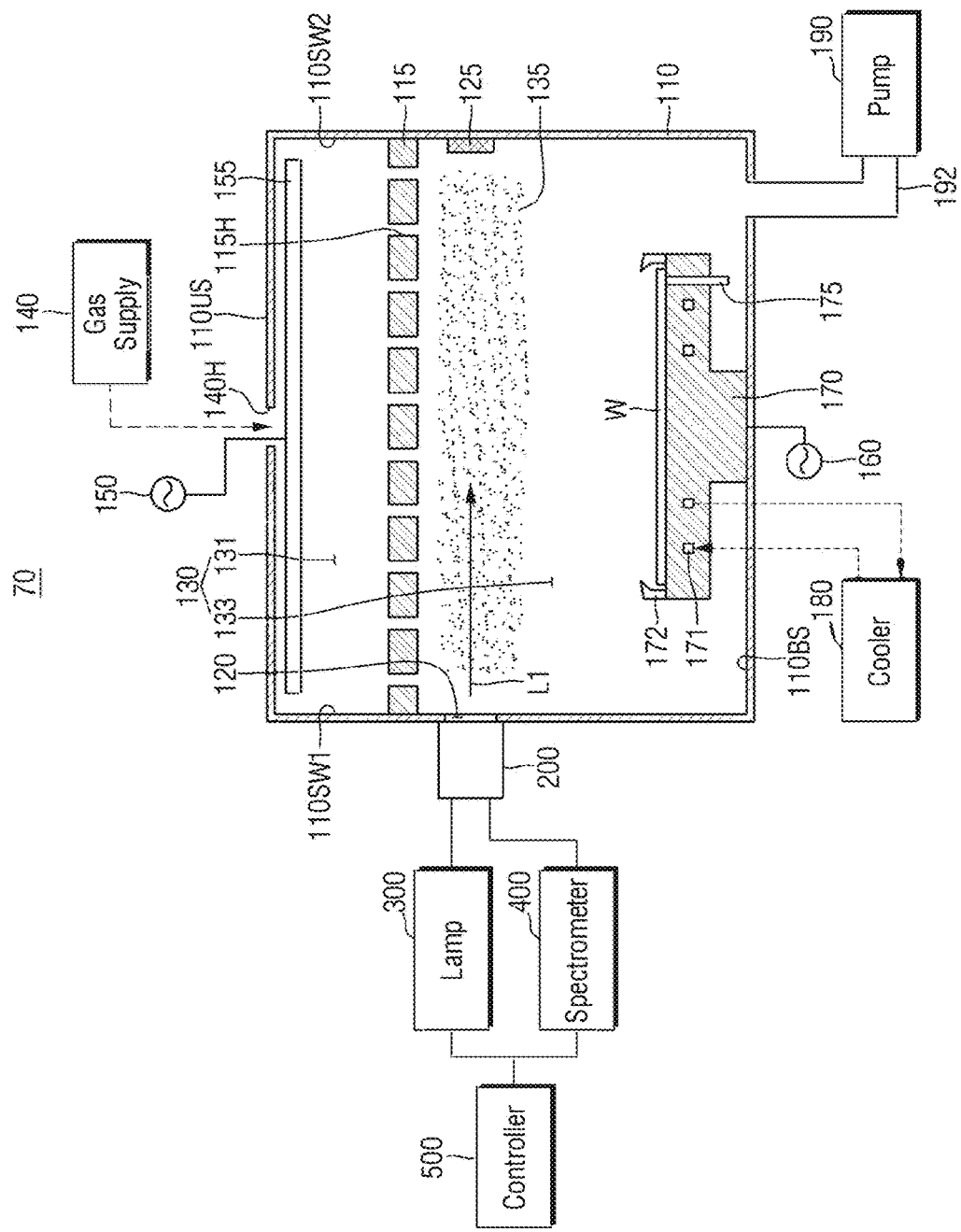
FIGS. 14 and 15 are respective cross-sectional diagrams further illustrating the method of manufacture of FIG. 13.
Figure 15:
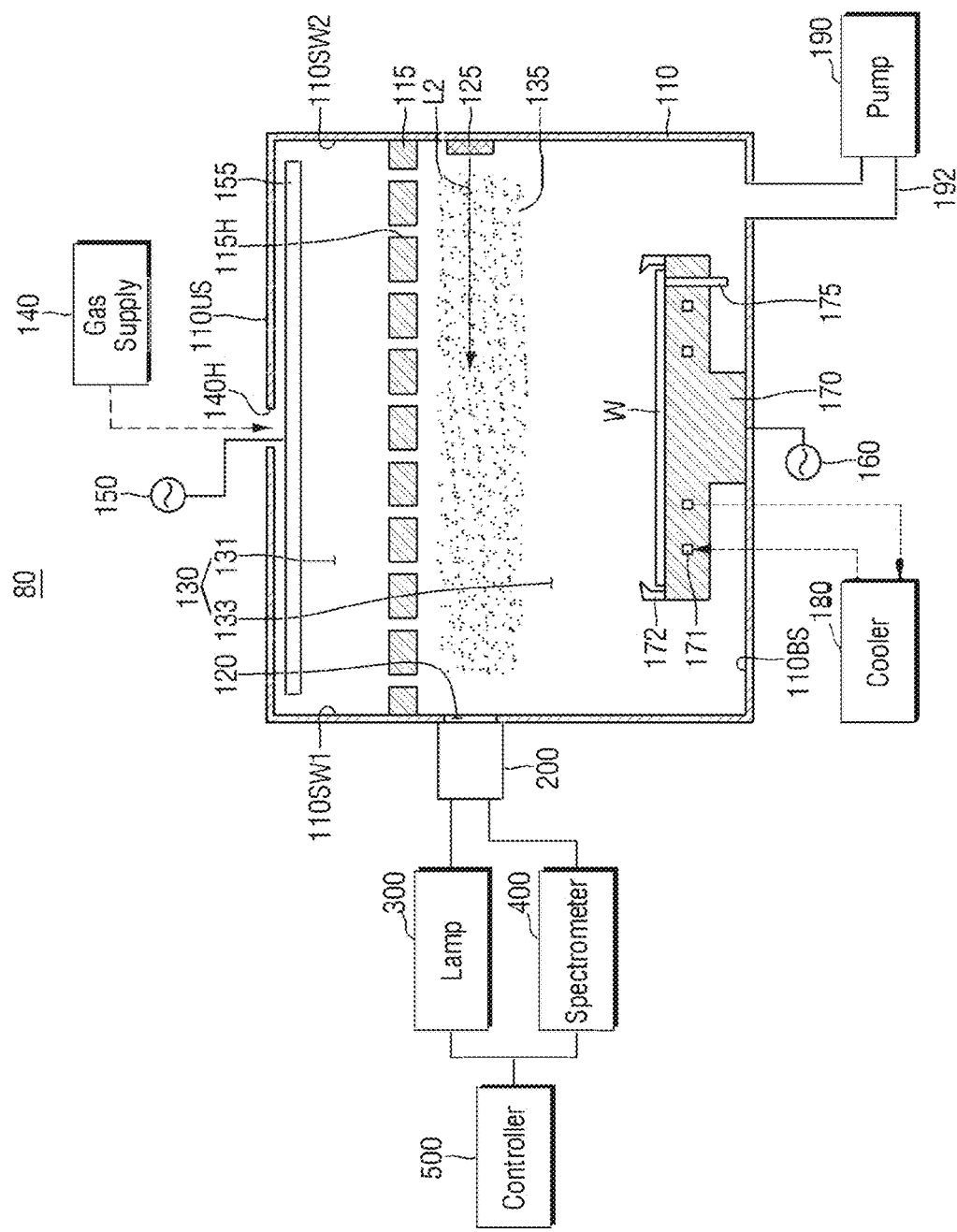
Figure 16:
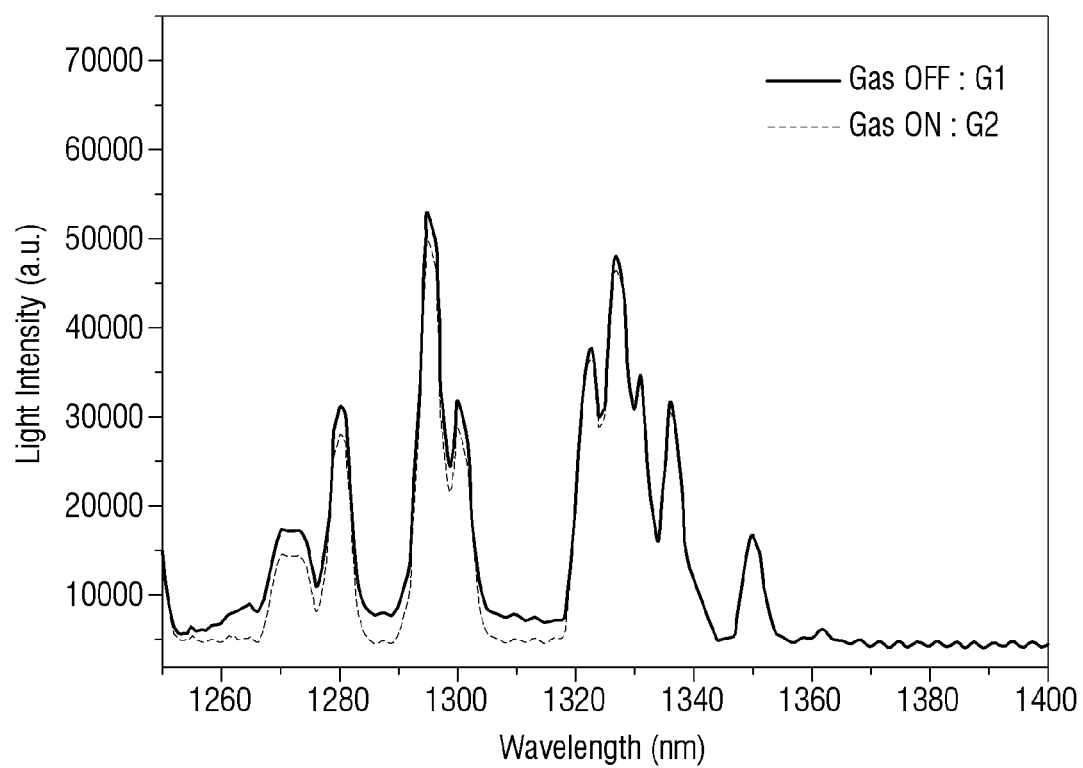
FIG. 16 is a graph illustrating exemplary results obtained by operation of a plasma processing apparatus according to embodiments of the inventive concept.

FIG. 13 is a flow chart illustrating a method of operating a plasma processing apparatus according to embodiments of the inventive concept; FIGS. 14 and 15 are respective cross-sectional diagrams conceptually illustrating the method of FIG. 13 in relation to a plasma processing apparatus 70; and FIG. 16 is a graph illustrating a relationship between light intensity and light wavelength between gas ON and OFF states.

Referring to FIG. 13, the method for operating a plasma processing apparatus may include emitting incident light to a processing region (S110), receiving reflected light from a reflector (S120), and determining density of the active species gas within the processing region in relation to the incident light and the reflected light (S130).

Referring to FIGS. 2, 13 and 14, some portion of the processing region 130 (e.g., the active species region 133) may be irradiated by the emitted incident light L1 (S110), thereby providing activated species gas 135 in the activated species region 133.

That is, the optical source unit 300 may be used to generate the incident light L1 having an first (or initial) intensity, wherein the generated incident light L1 is emitted by the optical source unit 200 through the viewing window 120. Here, the incident light L1 may be directed towards the reflector 125. Of note in this regard, the active species gas 135 will absorb a first portion of the incident light L1 as it passes in the forward direction.

Referring to FIGS. 2, 13 and 15, the incident light L1 may be reflected from the reflector 125 to generate reflected light L2 (S120) directed back towards the optical source unit 200 through the viewing window 120. Accordingly, the reflected light L2 passing through the viewing window 120 to reach the optical source unit 200 may be captured and provided to the spectroscope 400. Of further note in this regard, the active species gas 135 will absorb a second portion of the reflected light L2 as it passes in the reverse direction.

Referring to FIGS. 13 and 16, the density of the active species gas 135 within the processing region 130 may be determined in relation to the incident light L1 and the reflected light L2 (S130). For example, the controller 500 may calculate the density of the activated species gas 135 within the processing region 130.

The controller 500 may receive the first intensity of the incident light L1 and a second (reduced) intensity of the reflected light L2 from the optical source unit 300 and the spectroscope 400, and calculate the density of the active species gas 135 on the basis of the first intensity and the second intensity. In some embodiments, the controller 500 may calculate the density of the active species gas 135 using Beer-Lambert law, but the scope of the inventive concept is not limited thereto.

Referring to FIG. 16, a first plot 'G1' indicates a first light intensity state (Gas OFF) as a function of light wavelength before gas is introduced into the active species region 133. In contrast, a second plot 'G2' indicates a second light intensity state (Gas ON) as a function of light wavelength after gas is introduced into the active species region 133. As may be seen, an operator of the plasma processing apparatus 70 may confirm that light intensity has been reduced in relation to certain wavelengths. That is, the active species gas 135 has absorbed the first portion of the incident light L1 and the second portion of the reflected light L2, at least in relation to one or more wavelengths (or wavelength bands).

A method of manufacture for a semiconductor device using a plasma processing apparatus according to embodiments of the inventive concept will now be described with reference to the flowchart of FIG. 17.

Figure 17:
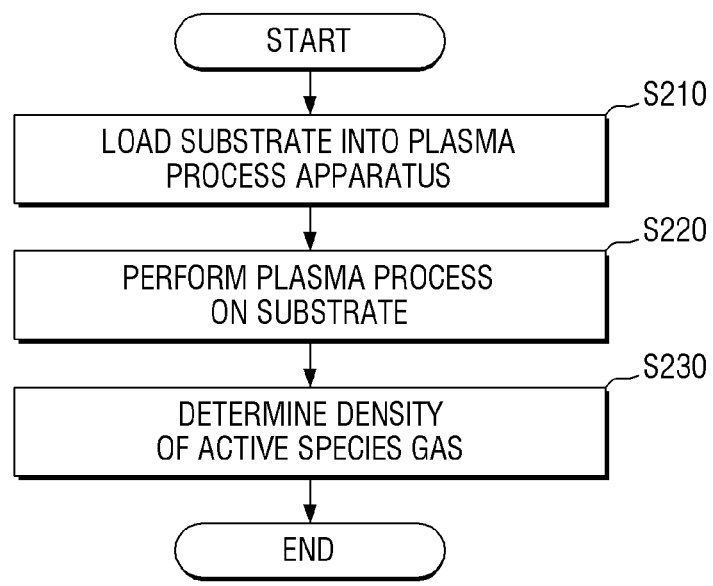
FIG. 17 is a flowchart illustrating in another embodiment a method of manufacture according to embodiments of the inventive concept.

Referring to FIGS. 2 and 17, the method of manufacture for the semiconductor device using a plasma processing apparatus may include: loading a substrate W into the plasma processing apparatus (S210); performing a plasma process (e.g., a cleaning process, a disposition process and/or an etching process) on the substrate W; and measuring the density of active species gas(es) (S230).

For example, the substrate W may be loaded within the processing region 130 (e.g., the active species region 133) of the plasma processing apparatus 10 of FIG. 2 (S210). The substrate support unit 170 may be used to support the substrate W by application of an electro-static force.

With the substrate W properly disposed and supported on the substrate support unit 170, one or more plasma process(es) may be performed on the substrate W (S230). For example, one or more of an etching process, a cleaning process, a deposition process, or the like may be a performed using plasma. In this regard, the process gas(es) may be introduced into the processing region 130 using the gas supply unit 140, and RF power may then be applied to the process gas to generate the plasma.

Thereafter, the processing region 130 may be irradiated with the incident light L1 through the viewing window 120, wherein the incident light L1 is directed towards the reflector 125. Accordingly, some portion of the incident light L1 will be reflected by the reflector 125 to generate the reflected light L2. The reflected light L2 may then be captured through the viewing window 120, condensed and provided to the spectroscope 400. Whereupon, the density of the active species gas(es) within the processing region 130 may be determined (e.g., measured and/or calculated) in relation to the incident light L1 and the reflected light L2. For example, the determination of the density of the active species gas(es) within the processing region 130 may be made in relation to the first intensity of the incident light L1 and the second intensity of the reflected light L2.

Here, it should be noted that various conditions associated with the semiconductor process, as well as various conditions and settings associated with the plasma processing apparatus may be controlled in relation to the determined density of the active species gas(es) using a method according to embodiments of the inventive concept. By so doing, a plasma process may be more accurately performed and a resulting semiconductor device may exhibit improved reliability.

Those skilled in the art will appreciate that many variations and modifications may be made to the illustrated embodiments presented herein without substantially departing from the scope of the inventive concept, as defined by the following claims.

What is claimed is:

1. A method of manufacture for a semiconductor device, the method comprising:
   loading a substrate into a plasma processing apparatus including a housing;
   performing a plasma process on the substrate; and
   determining a density of an active species gas within the plasma processing apparatus,
   wherein the determining of the density of the active species gas within the plasma processing apparatus includes:
      irradiating a processing region within the housing with incident light;
      receiving reflected light from a reflector disposed within the housing in response to the incident light; and
      determining the density of the active species gas within the plasma processing apparatus based on the reflected light.

2. The method of manufacture of claim 1, wherein the irradiating of the processing region within the housing with incident light includes:
   generating the incident light with an optical source unit; and
   emitting the incident light into the processing region through a viewing window in a first side wall of the housing.

3. The method of manufacture of claim 2, wherein the reflector is disposed on a second side wall of the housing opposing the first side wall and includes at least one of a silicon (Si) series material, $Y_2O_3$, or $YF_3$.

4. The method of manufacture of claim 2, wherein the optical source unit includes a xenon lamp configured to emit emitting the incident light in a wavelength band ranging from about 900 nm to about 1800 nm.

5. The method of manufacture of claim 2, wherein the determining of the density of the active species gas within the plasma processing apparatus includes:
   providing the reflected light to a spectrometer;
   determining an intensity of the reflected light using the spectrometer; and determining the density of the active species gas within the plasma processing apparatus based on the intensity of the reflected light and a first intensity of the incident light.

6. A plasma processing apparatus comprising:
a housing including a first side wall and a second side wall, wherein the housing defines a processing region in which a plasma process is performed;
an optical source unit disposed on the first side wall of the housing, wherein the optical source unit is configured to irradiate the plasma processing region with incident light through a viewing window in the housing during the plasma process;
a reflector disposed on an interior of the second side wall of the housing, wherein the reflector is configured to reflect a portion of the incident light irradiating the processing region to generate reflected light;
a spectrometer configured to receive the reflected light from the reflector through the viewing window and the optical source unit; and
a controller configured to determine a density of an active species gas within the processing region based on the reflected light.

7. The plasma processing apparatus of claim 6, wherein a first height from a bottom surface of the housing to a central portion of the viewing window is the same as a second height from the bottom surface of the housing to a central portion of the reflector, and
a forward direction of the incident light from the optical source unit to the reflector is parallel to a reverse direction of the reflected light from the reflector to the optical source unit.

8. The plasma processing apparatus of claim 6, wherein a first height from a bottom surface of the housing to a central portion of the viewing window is different from a second height from the bottom surface of the housing to a central portion of the reflector, and
a forward direction of the incident light from the optical source unit to the reflector is not parallel to a reverse direction of the reflected light from the reflector to the optical source unit.

9. The plasma processing apparatus of claim 6, wherein a first height from a bottom surface of the housing to a central portion of the viewing window is greater than a second height from the bottom surface of the housing to a central portion of the reflector,
the incident light is directed downwardly from the optical source unit to the reflector,
the reflected light is returned upwardly from the reflector to the optical source unit, and
a forward direction of the incident light is parallel to a reverse direction of the reflected light.

10. The plasma processing apparatus of claim 6, wherein a first height from a bottom surface of the housing to a central portion of the viewing window is less than a second height from the bottom surface of the housing to a central portion of the reflector,
the incident light is directed upwardly from the optical source unit to the reflector,
the reflected light is returned downwardly from the reflector to the optical source unit, and
a forward direction of the incident light is parallel to a reverse direction of the reflected light.

11. The plasma processing apparatus of claim 6, further comprising:
an additional reflector disposed at a different height on the interior of the second side wall of the housing from a height of the reflector, wherein the reflector and the additional reflector are configured to collectively generate the reflected light.

12. The plasma processing apparatus of claim 6, wherein the optical source unit is configured to generate the incident light in a wavelength band ranging from about 900 nm to about 1800 nm.

13. The plasma processing apparatus of claim 6, wherein the optical source unit includes a collimator, an irradiation unit, and a light-receiving unit, and
wherein the collimator is configured to control a forward direction of the incident light and a reverse direction of the reflected light.

14. The plasma processing apparatus of claim 13, wherein a diameter of the collimator is the same as a diameter of the reflector.

15. The plasma processing apparatus of claim 13, wherein the collimator includes a first sub-collimator configured to control the forward direction of the incident light and a second sub-collimator configured to control the reverse direction of the reflected light.

16. The plasma processing apparatus of claim 6, wherein the viewing window includes a first sub-viewing window in the first side wall of the housing and a second sub-viewing window, spaced apart from the first sub-viewing window, in the first side wall of the housing, and wherein the first sub-viewing window and the second sub-viewing window are arranged such that the incident light is emitted through the first sub-viewing window and the reflected light is received through the second sub-viewing window.

17. A plasma processing apparatus comprising:
a housing including a bottom surface, a top surface, a first side wall and a second side wall, wherein an interior of the housing defines a processing region;
a shower head disposed within the interior of the housing to divide the processing region into a plasma region in which plasma is generated and an active species region in which an active species gas is applied to a substrate;
a viewing window in the first side wall of the housing;
an optical source unit covering the viewing window, wherein the optical source unit includes a collimator and is configured to generate incident light irradiating the active species region in a wavelength band ranging from about 900 nm to about 1800 nm through the viewing window;
a reflector disposed on an interior of the second side wall, laterally aligned with the viewing window, and configured to reflect a portion of the incident light irradiating the active species region to generate reflected light;
a spectrometer configured to receive the reflected light from the reflector through the viewing window and the optical source unit; and
a controller configured to calculate a density of the active species gas within the active species region based on a first intensity of the incident light and a second intensity of the reflected light,
wherein the collimator is configured to control a forward direction of the incident light from the optical source unit to the reflector and a reverse direction of the reflected light from the reflector to the optical source unit, and wherein a diameter of the collimator is the same as a diameter of the reflector.

18. The plasma processing apparatus of claim 17, wherein the optical source unit includes a xenon lamp.

19. The plasma processing apparatus of claim 17, wherein the viewing window includes a first sub-viewing window through which the incident light is irradiated, and a second sub-viewing window spaced apart from the first sub-viewing window and through which the reflected light is received by the spectrometer.

20. The plasma processing apparatus of claim 17, wherein the forward direction of the incident light is parallel to the reverse direction of the reflected light.

\* \* \* \* \*